Patented July 8, 1924

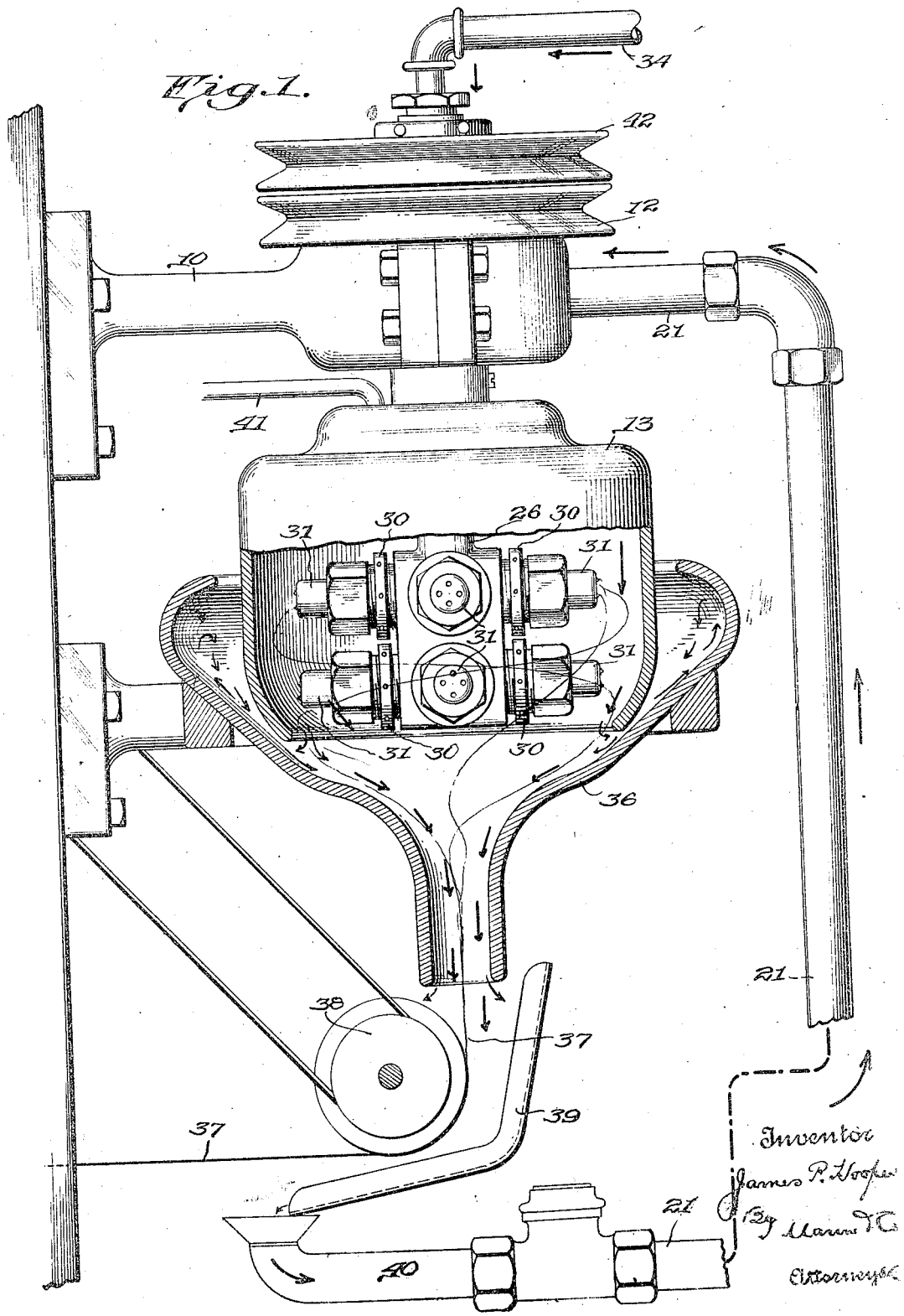

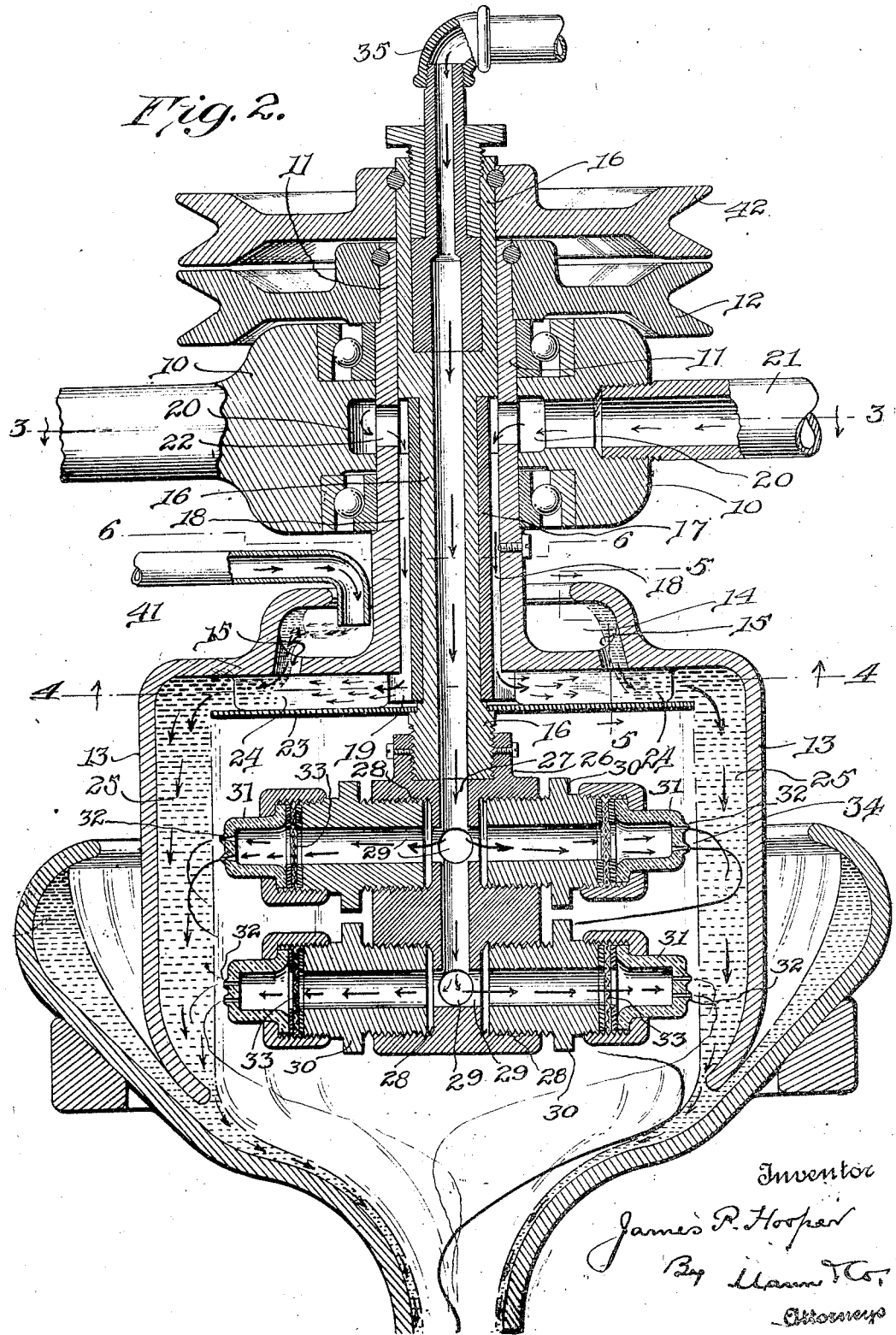

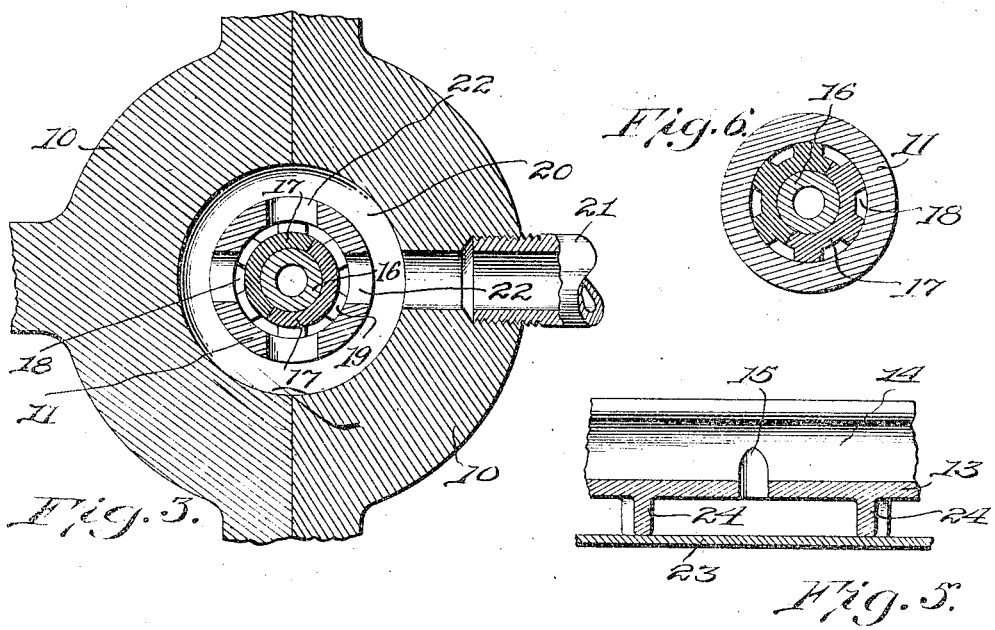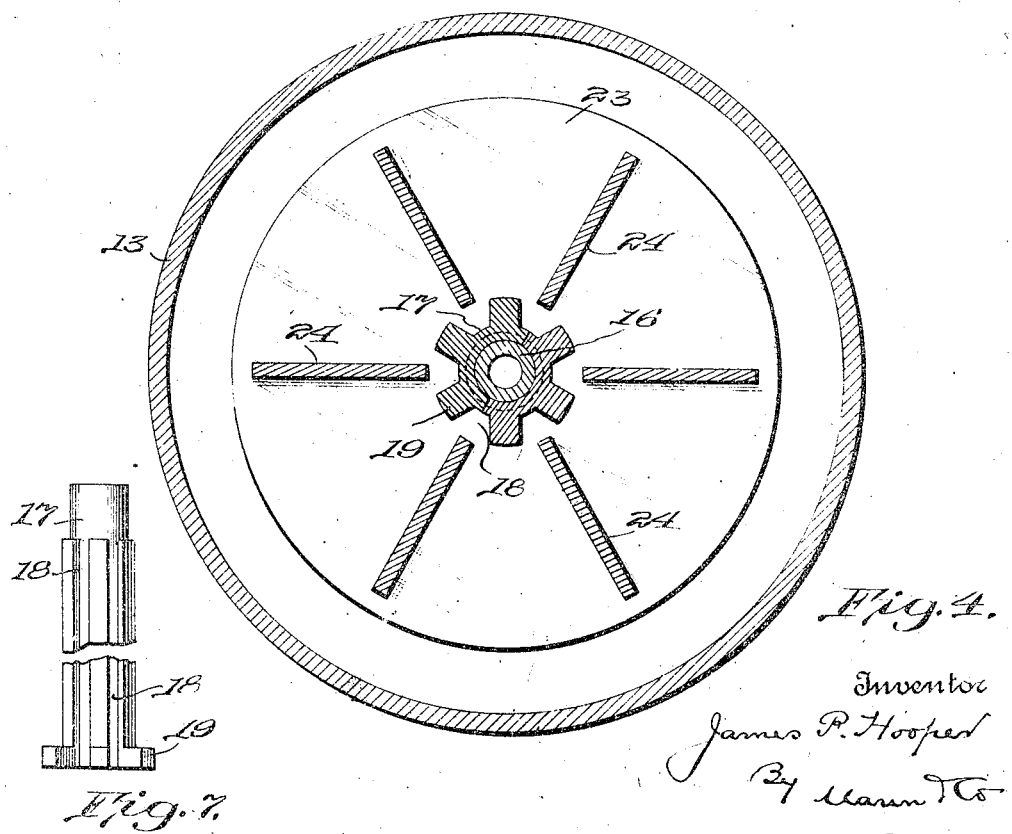

1,500,934

UNITED STATES PATENT OFFICE.

JAMES P. HOOPER, OF RUXTON, MARYLAND, ASSIGNOR TO JAMES P. HOOPER MANUFACTURING COMPANY, OF BALTIMORE, MARYLAND, A CORPORATION OF MARYLAND.

SPINNERET.

Application filed February 23, 1922. Serial No. 538,736.

*To all whom it may concern:*

Be it known that JAMES P. HOOPER, a citizen of the United States, residing at Ruxton, in the county of Baltimore and State of Maryland, has invented certain new and useful Improvements in Spinnerets, of which the following is a specification.

This invention relates to improvements in spinnerets and has reference to an improved device for producing artificial threads from viscose or equivalent substances.

The object of the invention is to provide an improved structure whereby the viscose solution may be ejected in the form of threads by centrifugal force thereby avoiding the necessity of utilizing pumps.

The invention is illustrated in the accompanying drawings, wherein,—

Fig. 1. shows the improved device in side elevation,—several of the elements being broken away to show the inner rotating member.

Fig. 2. illustrates the device in central vertical section.

Fig. 3. shows a cross-sectional detail through the structure,—the section being taken on the line 3—3 of Fig. 2.

Fig. 4. illustrates another cross-sectional detail taken on the line 4—4 of Fig. 2.

Fig. 5. shows an enlarged vertical sectional detail,—the section being taken on the line 5—5 of Fig. 2.

Fig. 6. illustrates a cross-sectional detail taken on the line 6—6 of Fig. 2, and Fig. 7. shows one of the members of the detached groove sleeve which produces passage-ways for the flow of setting solution.

Referring to the drawings and particularly Fig. 3 thereof, the numeral 10 designates a bracket or support in which a hollow shaft 11 is sustained. This shaft carries a pulley 12 at one end, by means of which the same may be revolved, while the other end of said shaft carries an annular shell 13 which is designed, in this instance to be revolved with the shaft.

In the present instance the shaft is vertical and the shell 13 depends from the lower end thereof and is open at the bottom.

On the upper side of the shell there is found an annular chamber 14, which is open at the top and a series of ports 15 extend from said chamber 14 to the interior and upper portion of the annular shell, all for a purpose that will presently be explained.

On the interior of the hollow shaft 11, there is provided an inner tubular shaft 16 whose lower end is reduced in diameter and around which reduced portion there is provided a tubular sleeve 17. This sleeve is formed in two parts or halves, which, when assembled, form a complete sleeve between the shaft 11 and the shaft 16.

The outer side of this sleeve 17 is provided with a series of vertical grooves 18, which are clearly shown in Figs. 4 and 7 of the drawings. Around the lower end, the sleeve 17 is provided with a series of outwardly-projecting or radial lugs 19 for a purpose presently to be explained.

The sleeve 17, in this instance is designed to be rotated with the outer shaft 11 and the shell 13.

An annular chamber 20 is formed in the bracket or support 10 and a pipe 21 is tapped into one side of this support and supplies a setting solution to said chamber.

Perforations 22 are provided at intervals around the outer shaft 11 so as to provide continuous communication between the chamber 20 and the vertical passages 18 on the outer side of the sleeve whereby the setting solution may be fed from the chamber 20 through the perforations 22 to the vertical passages 18 and conveyed down to the interior of the annular shell 13.

A disk or baffle-plate 23 is carried on the inner shaft 16 directly beneath the top of the shell 13 while the under side of said shell-top is provided with a series of depending lugs or flanges 24 which extend down toward the upper side of the disk 23 but are not attached to the latter. These flanges 24, radiate with respect to the lower end of the sleeve 17 and the sleeve, shell, and the flanges 24 all revolve together.

It will thus be understood that as the setting solution flows down the passages 18, it will be rotated, and as it reached the lower ends of those passages it will be thrown laterally over the disk 23, by the radial lugs 19 whereupon it will be caught up by the flanges 24 and swept from the disk or baffle to the inner side of the shell-wall 13 so as to form a column 25 of whirling solution as it moves downwardly in the shell.

The lower end of the inner tubular shaft 16 carries a head 26 which latter has a central main passage 27 which communicates with the central passage of said shaft, and said head is also provided with a plurality of radially-disposed sockets 28. Radial passages 29 are provided in the head to establish communication between the main passage 27 and the several sockets.

Each socket 28 carries a short union 30 with a passage therethrough and to each union there is attached a nipple 31 each of which latter has one or more fine perforations 32.

In the present instance I prefer to provide a filtering screen 33 between the nipples and the unions whereby to filter the material which is fed through the unions to the nipples.

By reference to Fig. 1, it will be noted that the head 26, carries an upper and a lower series of nozzles 31 which latter are to be revolved rapidly in a horizontal plane so the discharge-ends of the nozzles will be moved through a circular path beneath the baffle or disk 23 and within the interior of the shell 13.

By referring to Fig. 2 it will be noted that the ends of the nozzles will be slightly spaced from the wall or column of setting solution 25 whereby to produce an air gap 34 between the outlet ends of the discharge-perforations 32, and said solution column across which the viscous threads will project as they are ejected from the perforations.

It is to be understood that the thread-forming viscous solution will be supplied by pipe 35 into the end of the inner shaft 16 and that it will flow through said shaft into the central passage 27 of the revolving head 26. This head and the shaft 16 will be rapidly revolved whereby to cause the viscous solution to be thrown laterally through the radial passages 29. The solution will then pass through the filtering screens 33 and into the nozzles 31, from which latter it will be ejected through the fine passages 32 in the form of fine threads.

These ejected threads, upon leaving the nozzles, will extend across the gap 34 and then enter the whirling setting solution 35 which will catch up the strands and twist them together into a thread while they are becoming set. This action takes place as the thread travels downwardly in the rotating shell with the column of setting solution.

After leaving the revolving shell 13 the setting solution and twisted threads pass through a guide-funnel 36, after which the thread 37 may be led around a roll 38 and wound on a drum or otherwise taken care of.

The setting solution may be caught in a trough 39 and returned by pipes 40 and 21 back to the chamber 20 where it may be utilized again.

In some instances I may provide a supply pipe 41 to constantly add a small quantity of setting solution into chamber 14 from which it will flow by ports 15, to the upper side of the disk or baffle 23 where it will mix with the solution flowing from chamber 20 and thus maintain the setting solution at proper strength.

A pulley 42 on the upper end of the inner shaft 16, may be driven by a belt so as to continuously revolve said inner shaft and head.

Having described my invention, I claim,—

1. A device for forming threads including a plurality of radially arranged suspended nozzles with means for rapidly moving the same through a circular path, means for supplying a thread-forming material to said nozzles to be ejected therefrom by centrifugal force in the form of continuous threads as the nozzles are moved and means for setting the ejected threads.

2. A device for forming threads including a hollow pendant shaft, a plurality of nozzles radiating from the end of said shaft, means for supplying a thread-forming material to the nozzles through the shaft, means for rapidly revolving the shaft to move the nozzles through a circular path and eject the material therefrom in the form of continuous threads and means for setting the threads ejected from the suspended nozzles.

3. A device for forming threads including a plurality of suspended nozzles, means for supplying a thread-forming material to said nozzles, means for rapidly moving the nozzles through a circular path to eject the material by centrifugal force in the form of continuous threads, and means for maintaining a moving column of setting solution around the discharge-ends of the nozzles.

4. A device for forming threads including a plurality of nozzles, means for supplying a thread-forming material to said nozzles, means for rapidly moving the nozzles through a circular path to eject the material by centrifugal force, a shell about the nozzles and means for maintaining a stream of setting solution about the wall of the shell.

5. A device for forming threads including a plurality of nozzles, means for supplying a thread-forming material to said nozzles, means for rapidly moving the nozzles through a circular path to eject the material by centrifugal force, means for setting the ejected material and means for twisting the ejected material.

6. A device for forming threads including a plurality of nozzles, means for supplying a thread-forming material to said nozzles, means for rapidly moving the nozzles through a circular path to eject the material by centrifugal force, a shell about the nozzles, means for supplying a setting solution to the shell and means for rotating the setting solution to twist the ejected material.

7. A device for forming threads including a hollow shaft, a plurality of nozzles radiating from said shaft, means for supplying a thread-forming material to the nozzles through the shaft, means for rapidly revolving the shaft to move the nozzles through a circular path and eject the material therefrom by centrifugal force, an annular structure encircling the nozzles and means for supplying a setting solution to the shell to receive the ejected material.

8. A device for forming threads including a hollow shaft, a plurality of nozzles radiating from said shaft, means for supplying a thread-forming material to the nozzles through the shaft, means for rapidly revolving the shaft to move the nozzles through a circular path and eject the material therefrom by centrifugal force, an annular structure encircling the nozzles, means for revolving the shell and means for supplying a setting solution to the revolving shell.

9. A device for forming threads including a structure having a plurality of nozzles, means for supplying a thread-forming material to said nozzles, means for rapidly moving the nozzles through a circular path to eject the material therefrom by centrifugal force and means for maintaining a setting solution about the nozzles but spaced from the latter whereby to form a gap between the nozzles and said bath.

10. A device for forming threads including a structure having a plurality of nozzles, means for supplying a thread-forming material to said nozzles, means for rapidly moving the nozzles through a circular path to eject the material therefrom by centrifugal force, a shell about the nozzles, means for supplying a setting solution to the shell above the nozzles, and a baffle in the shell between the nozzles and the solution supply whereby to keep the solution spaced from the nozzles and form a gap between the nozzle-ends and said solution.

11. A device for forming threads including a hollow pendant shaft, a plurality of nozzles radiating from the end of said shaft said nozzles being arranged with one set above another, means for supplying a thread-forming material to the nozzles through the shaft, means for rapidly rotating the shaft and nozzles to eject the material by centrifugal force in the form of continuous threads and twisting said threads together and means for setting the ejected material.

In testimony whereof I affix my signature.

JAMES P. HOOPER.